US012686321B2

(12) United States Patent
Metternich

(10) Patent No.: US 12,686,321 B2
(45) Date of Patent: Jul. 21, 2026

(54) LOWERABLE CONTAINER LOCK

(71) Applicant: Hamburger Patent Schmiede GmbH, Buchholz (DE)

(72) Inventor: Heinz-Ruediger Metternich, Eversen-Heide (DE)

(73) Assignee: Hamburger Patent Schmiede GmbH, Buchholz (DE)

( * ) Notice: Subject to any disclaimer, the term of this patent is extended or adjusted under 35 U.S.C. 154(b) by 345 days.

(21) Appl. No.: 18/565,949

(22) PCT Filed: Jun. 8, 2022

(86) PCT No.: PCT/DE2022/100426
§ 371 (c)(1),
(2) Date: Nov. 30, 2023

(87) PCT Pub. No.: WO2022/258112
PCT Pub. Date: Dec. 15, 2022

(65) Prior Publication Data
US 2024/0262282 A1 Aug. 8, 2024

(30) Foreign Application Priority Data

Jun. 10, 2021 (DE) ..................... 10 2021 115 027.2

(51) Int. Cl.
*B60P 7/13* (2006.01)
(52) U.S. Cl.
CPC ......... *B60P 7/132* (2013.01); *B60Y 2400/408* (2013.01)
(58) Field of Classification Search
CPC ........................... B60P 7/132; B60Y 2400/408
See application file for complete search history.

(56) References Cited

U.S. PATENT DOCUMENTS 4,108,081 A * 8/1978 Blanz ..................... B60P 7/132
410/82
2015/0232013 A1 8/2015 Lanigan, Sr. et al.
2021/0394666 A1* 12/2021 Newstead .......... B65D 90/0013

FOREIGN PATENT DOCUMENTS

CN 211468283 U 9/2020
DE 19720238 A1 11/1998
(Continued)

OTHER PUBLICATIONS

International Search Report issued on Aug. 25, 2022, in International Application No. PCT/DE2022/100426.

*Primary Examiner* — Dany E Akakpo
(74) *Attorney, Agent, or Firm* — Patent Central LLC; Stephan A. Pendorf

(57) ABSTRACT

A container locking device on a vehicle, for locking a container having a corner fitting to be transported on a loading surface of the vehicle, the device including a lock housing (1), a locking bolt (2) and a first drive (3). The locking bolt (2) has a shaft (20) and a locking head (21) which, in the unlocked state, can be introduced via an opening in the corner fitting of the container and, in the locked state, secures the container via projections engaging behind the opening in the corner fitting. The lock housing (1) with the locking bolt (2) can be lowered and raised again by means of a lever mechanism (7) from a locking position, in which the locking head (21) projects sufficiently above the loading surface for locking with the corner fitting of the container, into a rest position, in which the locking head (21) does not project above the loading surface. The first drive (3) is operatively connected solely to the locking bolt (2), and a second drive (6) is operatively connected to the lever mechanism (7).

3 Claims, 5 Drawing Sheets

(56)         References Cited

FOREIGN PATENT DOCUMENTS

Figure 1:
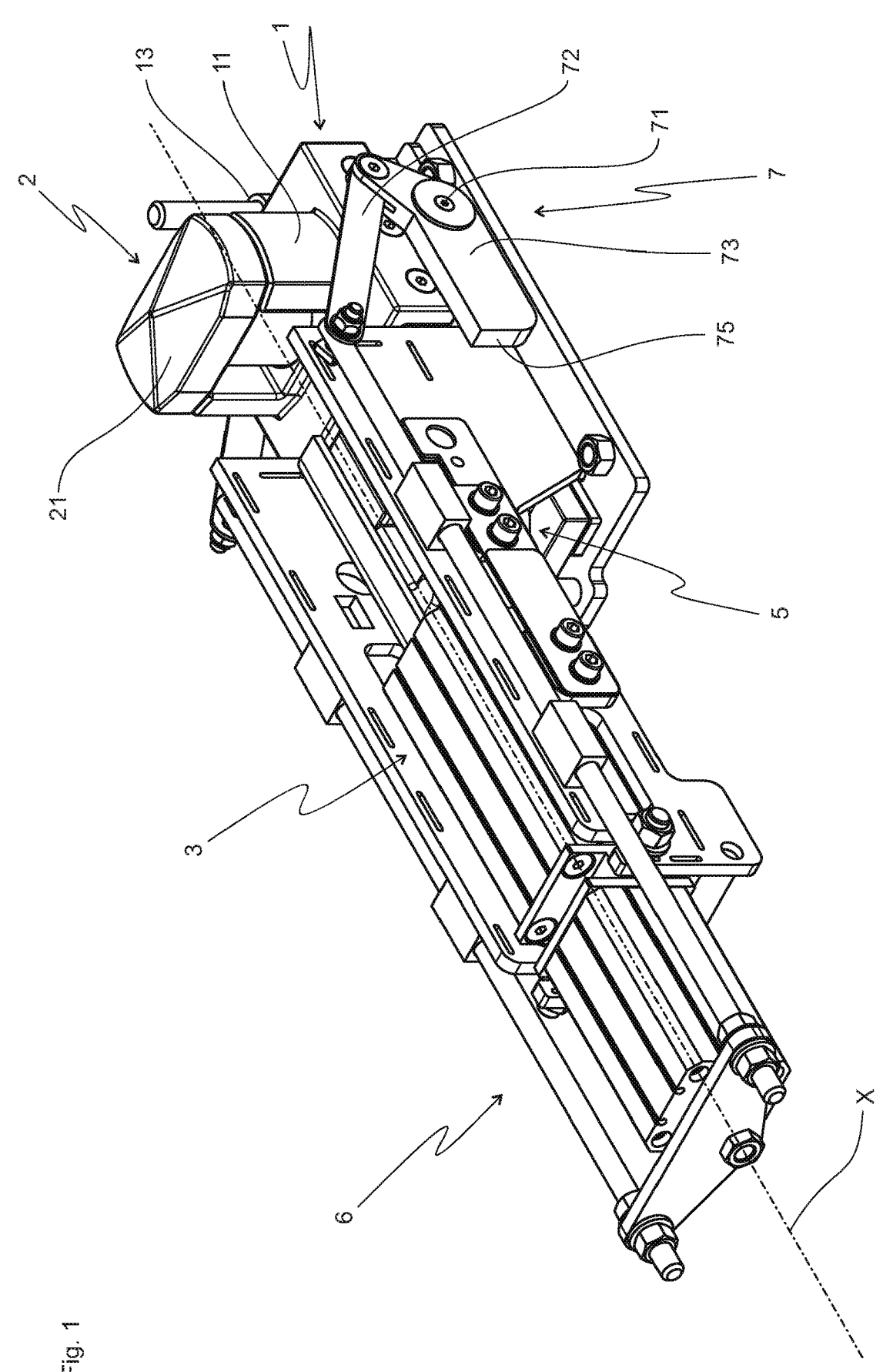

| DE | 19718528 | C1 | 12/1998 |
| DE | 20119415 | U1 | 4/2003 |
| DE | 102005062339 | A1 | 6/2007 |
| DE | 102021112894 | A1 | 11/2022 |
| EP | 1243466 | B1 | 10/2003 |
| EP | 1810879 | A1 | 7/2007 |
| EP | 3802217 | A1 | 4/2021 |
| KR | 20210096524 | A | 8/2021 |
| WO | 2021007631 | A1 | 1/2021 |

* cited by examiner

A-A (1:2)

B-B ( 1 : 2 )

C-C ( 1 : 2 )

LOWERABLE CONTAINER LOCK

The invention relates to a container locking device on a vehicle, for locking a container with a corner fitting to be transported on a loading surface of the vehicle, having a locking housing, a locking bolt and a first drive, the locking bolt having a shaft and a locking head which in the unlocked state can be inserted into an opening in the corner fitting of the container and in the locked state secures the container via projections fitting behind the opening of the corner fitting, the locking housing with the locking bolt can be lowered and raised again by means of a lever mechanism, from a locking position, in which the locking head projects sufficiently above the loading surface for locking with the corner fitting of the container, into a rest position, in which the locking head does not project above the loading surface.

In the not yet published DE 10 2021 112 894 by the same applicant, a fixed container locking device for locking a container with a corner fitting to be transported on a loading surface of a vehicle is disclosed, which has a locking housing, a locking bolt and a drive, the locking bolt having a shaft and a locking head which, when unlocked, can be inserted via an opening in the corner fitting of the container and, when locked, secures the container via projections engaging behind the opening of the corner fitting.

Container locking devices that are permanently arranged on the loading surface of the vehicle are also known in the prior art in a wide variety of designs. From WO 2021/007631 A1 an automatic, fixed container lock with two electric drive motors for rotating the locking bolt and for clamping the locking bolt within the corner fitting of the container to be loaded is known. Similar locationally fixed locks are known from CN 211468283 U, KR 10-2021-0096524 A, DE 10 2005 062 339 A1, DE 197 20 238 A1 and US 2015/0232013 A1.

From DE 197 18 528 C1 a device is known which is equipped for selectively reciprocating drive parts of a mechanism for raising, lowering and locking a fitting of a container by means of a piston-cylinder arrangement actuated by pressure medium.

Furthermore, from EP 1 243 466 B1 and DE 201 19 415 U1 a locking device and a method for it are known, in which the locking mechanism is raised from the translational movement via a pivoting movement derived therefrom into the extended position via a piston-cylinder arrangement and subsequently the locking process is feasible. Conversely, after the lock has been released by a corresponding backward translational movement of the same piston-cylinder arrangement, the lock is first released and then, with further extension movement, the locking mechanism is lowered into the retracted position via a pivoting movement derived therefrom.

The disadvantage of this device is that when the locking device is actuated, the entire movement sequence is carried out, i.e. from when the lock is released, the locking head is first raised and rotated into the unlocked position and subsequently the entire locking device is lowered below the loading surface level of the vehicle. Conversely, when locking, the locking device is first raised so that it protrudes above the loading surface, and then the actual locking process with the corner fitting of a loaded container is executed. If lowering the locking device is not actually necessary because a container is to be loaded again at the same position, the entire sequence of movements must still be carried out, which leads to unnecessary operation and thus wear and also requires a considerable amount of time.

The object of the invention is therefore to be able to carry out the two movement sequences individually, which do not necessarily have to be carried out one after the other.

This task is solved with a container locking device according to claim 1.

The locking housing with the locking bolt is designed to be lowerable and raised again by means of a lever mechanism from a locking position in which the locking head protrudes sufficiently over the loading surface for locking with the corner fitting of the container, to a rest position in which the locking head does not protrude over the loading surface, wherein a first drive is operatively connected exclusively to the locking bolt and a second drive is provided which is operatively connected to the lever mechanism. This ensures that the separate second drive makes it possible to raise or lower the container lock via the separate drive independently of the actuation of the lock. For example, if a container is unloaded from the loading surface of the vehicle, only the first drive is needed to adjust the locking bolt to its unlocked state. The container can then be unloaded. If a container of the same type with the same locking configuration is placed back on the loading surface, the locking device does not need to be lowered, so the second drive need not be actuated and a newly placed container can be placed and secured again by actuating the first drive and thus adjusting the locking bolt from the unlocked state into the locked state.

Unnecessary actuation of the lever mechanism to lower the container lock below the loading surface and raise the container lock again to protrude above the loading surface can therefore be avoided.

Thereby, that the first drive has a first double-acting pneumatic cylinder with a first piston rod movable in an actuation direction and the second drive has a second double-acting pneumatic cylinder with a second piston rod that is also movable in the actuation direction, the second pneumatic cylinder being provided behind the first pneumatic cylinder in the actuation direction and arranged together with this on and/or in an elongated drive box and connected to the lever mechanism via laterally guided push rods, the two drives can be arranged one behind the other in one elongated, narrow drive box, which can be easily connected to the loading surface of the vehicle, in particular be mounted between the support beams of the container chassis. Retrofitting existing container chassis with this container lock, which can be raised and lowered, is therefore possible without much effort. Since a container towing vehicle may supply compressed air from the tractor to the semi-trailer container chassis, pneumatic cylinders can preferably be used for actuation.

If the lever mechanism has a crank pivot arranged horizontally and perpendicular to the direction of actuation on the locking housing which can be raised and lowered, a crank rod that is articulated to a push rod and a lever that can be rotated about the crank pivot by means of the crank rod, the locking housing can be raised by the lever mechanism rotating when the second drive is actuated to turn the lever by supporting it on a lower base plate of the drive box and in this raised position the locking housing can be supported in a load-bearing manner. For this purpose, the lever has a straight supporting edge at the outer end which is farthest from the crank pivot.

In order to be able to realize the same type of actuation of the locking bolt in the locking housing according to the not yet published DE 10 2021 112 894, a wedge slide is arranged in the locking housing and is mounted so that it can be moved laterally back and forth and in the locking position of the locking housing there is a drive claw at the free end of the first piston rod which engages with the wedge slide. When the locking housing with the locking bolt is lowered into the lowered rest position, the wedge slide arranged in the locking housing is also lowered and thus separated from the drive claw at the free end of the first piston rod and later brought back into engagement when the locking housing is raised again from the rest position back into the locking position.

Since a locking device is arranged on the elongated drive box, which has a spring-loaded safety lock which is designed to engage in the lateral movement path of the wedge slide, with an inclined support being formed between the lock and the wedge slide, when the locking housing is raised from the rest position into the locking position it causes the lock to be released. This means that the locking housing can be lowered and raised again, even in a container locking device with a safety locking device for preventing lateral movement of the wedge slide.

Figure 2:
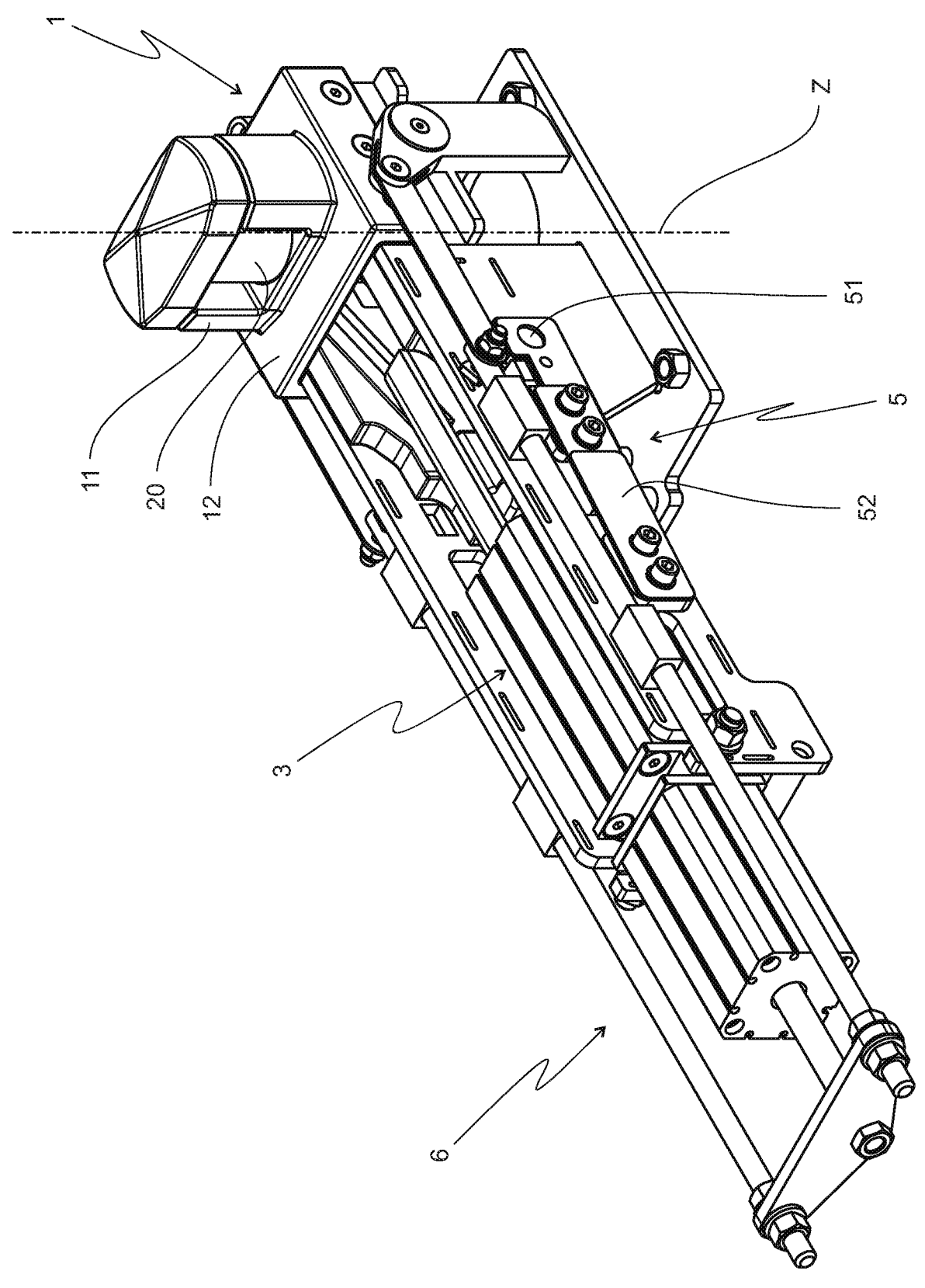
Figures 3A, 3B:
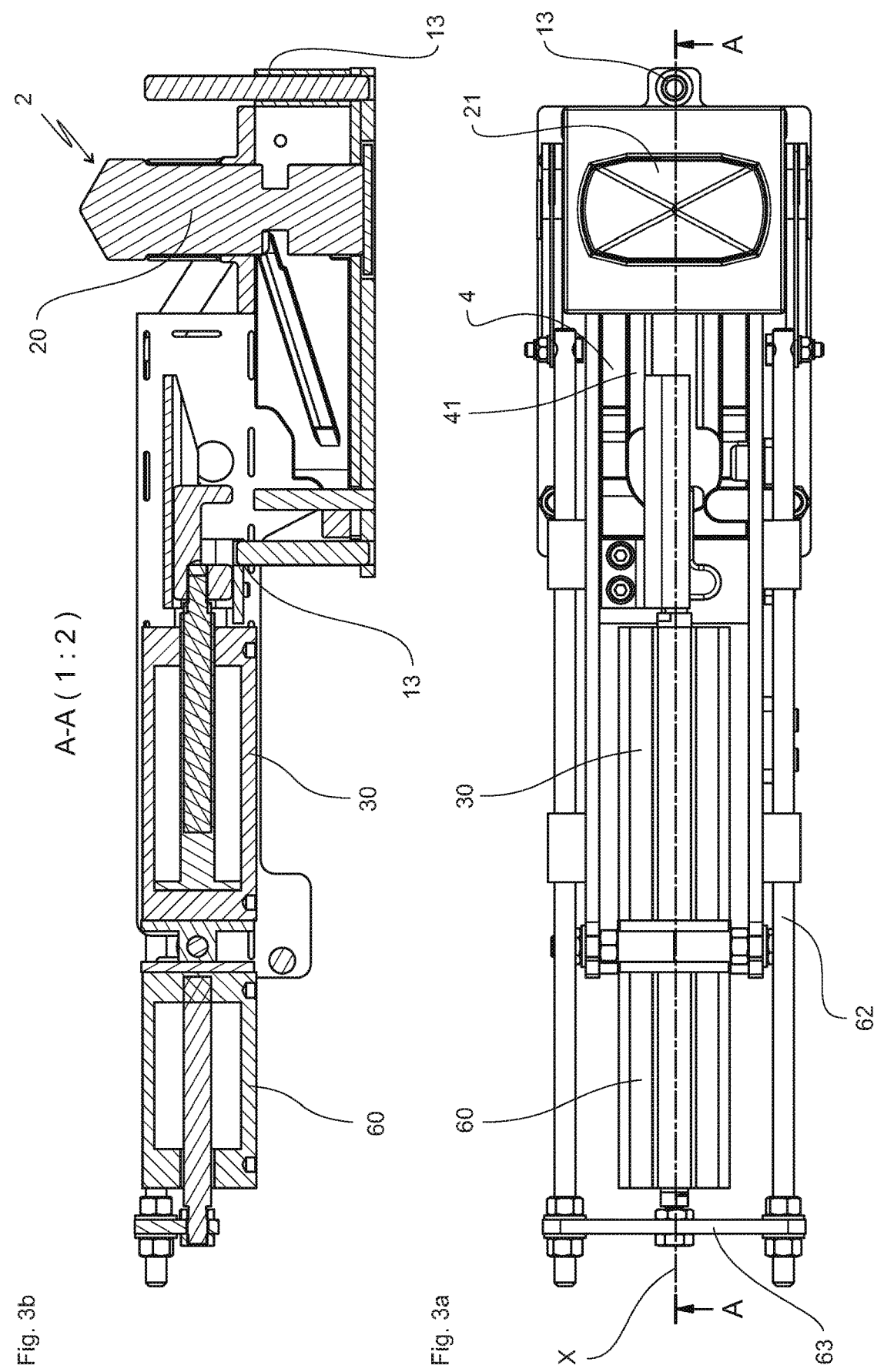
Figures 4A, 4B:
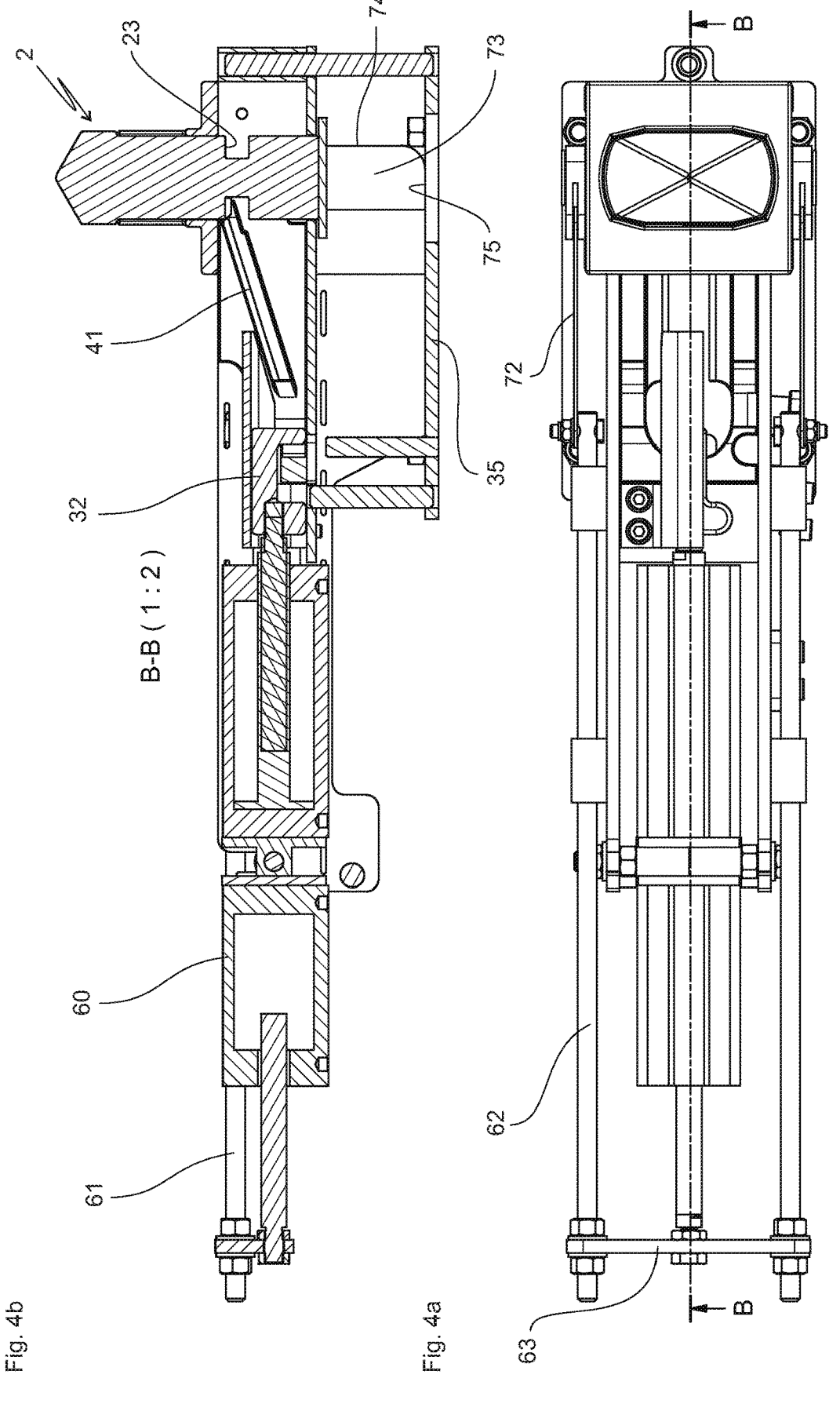

An exemplary embodiment of the invention is described in detail below with reference to the accompanying figures. There is shown in:

FIG. 1 a spatial view of the lowerable container locking device in its rest position, FIG. 2 a spatial view of the container locking device according to FIG. 1 in the raised locking position, FIGS. 3 a, b a top view and a cross section of the container locking device in the rest position according to FIG. 1, FIG. 4 a, b the container locking device in plan view and cross section in the locking position according to FIG. 2 and FIGS. 5 a, b the container locking device in cross section and top view in FIGS. 4 a and b during the locking process.

FIG. 1 shows a spatial view of a container locking device with a lowerable locking housing 1 in the lowered state (rest position). In FIG. 2, the container lock according to FIG. 1 is shown in a corresponding spatial view with its locking housing 1 in the raised position (locking position). The locking housing 1 of the container locking device has a guide component 11 and a load bearing surface 12. The lock also includes a locking bolt 2, which is mounted with its shaft 20 so that it can rotate about a vertical axis Z in the locking housing 1 and can be displaced in the axial direction.

The locking bolt 2 has a locking head 21 at the upper end of the shaft 20, which in the unlocked state, as shown in FIGS. 1 and 2, covers the guide component 11 in an aligned manner. In this unlocked state, if the container locking device is in the locking position, i.e. in the raised position according to FIG. 2, a container can be unloaded onto the loading surface of the vehicle and with its corner fitting and the opening formed therein can be seated on the load support surface 12 via the locking head 21 and the guide component 11. Subsequently, by actuating the locking device, the locking bolt 2 and thus the locking head 21 can be rotated and lowered between the sections of the guide component 11 so that the locking head 21 holds the container in a form-fitting manner from behind via the opening of the corner fitting (locked state). An intermediate state to this locked state is shown in FIGS. 5 a and b.

To drive the locking device, a first drive 3 in the form of a first double-acting pneumatic cylinder 30 is provided in an elongated drive box 34. The first double-acting pneumatic cylinder 30, with its first piston rod 31 oriented in the direction of the locking housing 1 and the locking bolts 2 mounted therein, acts via a drive claw 32 on a wedge slide 4, which is positioned laterally within the locking housing 1, i.e. in the direction of movement X of the first piston rod 31 and can be moved back and forth.

An inclined support 41 is formed in the wedge slide 4, which interacts with a correspondingly assigned recess 23 in the shaft 20 of the locking bolt 2 in such a way that when the wedge slide 4 is moved in in the direction towards the locking bolt 2 from the position shown in FIG. 2 (see also FIG. 4 a, 4 b) the locking bolt 2 is rotated into the already slightly rotated position of shown in FIGS. 5 a, b, which can be seen in FIG. 5 a by the inclined locking head 21. The inclined support 41, in particular with a pushing protrusion 42 (see FIG. 5 b), interacts with the recess 23 and there in particular a contact edge 24 in such a way that the locking bolt 2 with its shaft 20 is initially rotated by 90° about the vertical axis Z and then, as the wedge slide 4 is pushed in further, the locking bolt 2 and thus the locking head 21 connected to the shaft 20 are lowered between the two sections of the guide component 11. This locking process is described in the not yet published DE 10 2021 112 894 by the same applicant.

It describes in more detail that when the container lock is actuated when the locked state is reached, the wedge slide 4 is completely shifted to the right in the drawing plane according to FIG. 5 b and consequently the locking head 21 is adjusted by 90° to the view according to FIG. 4 a and the locking device locks with projections behind a corner fitting of a loaded container.

A locking device 5 with lock 51 which is resiliently preloaded via a leaf spring 52 acts on the elongated drive box 34 in such a way that when the locked state is reached, the lock 51 springs into the path of the wedge slide 4 by means of the leaf spring 52, so that the wedge slide 4 cannot be reset, i.e. there is a positive locking in the locked state.

Figures 5A, 5B:
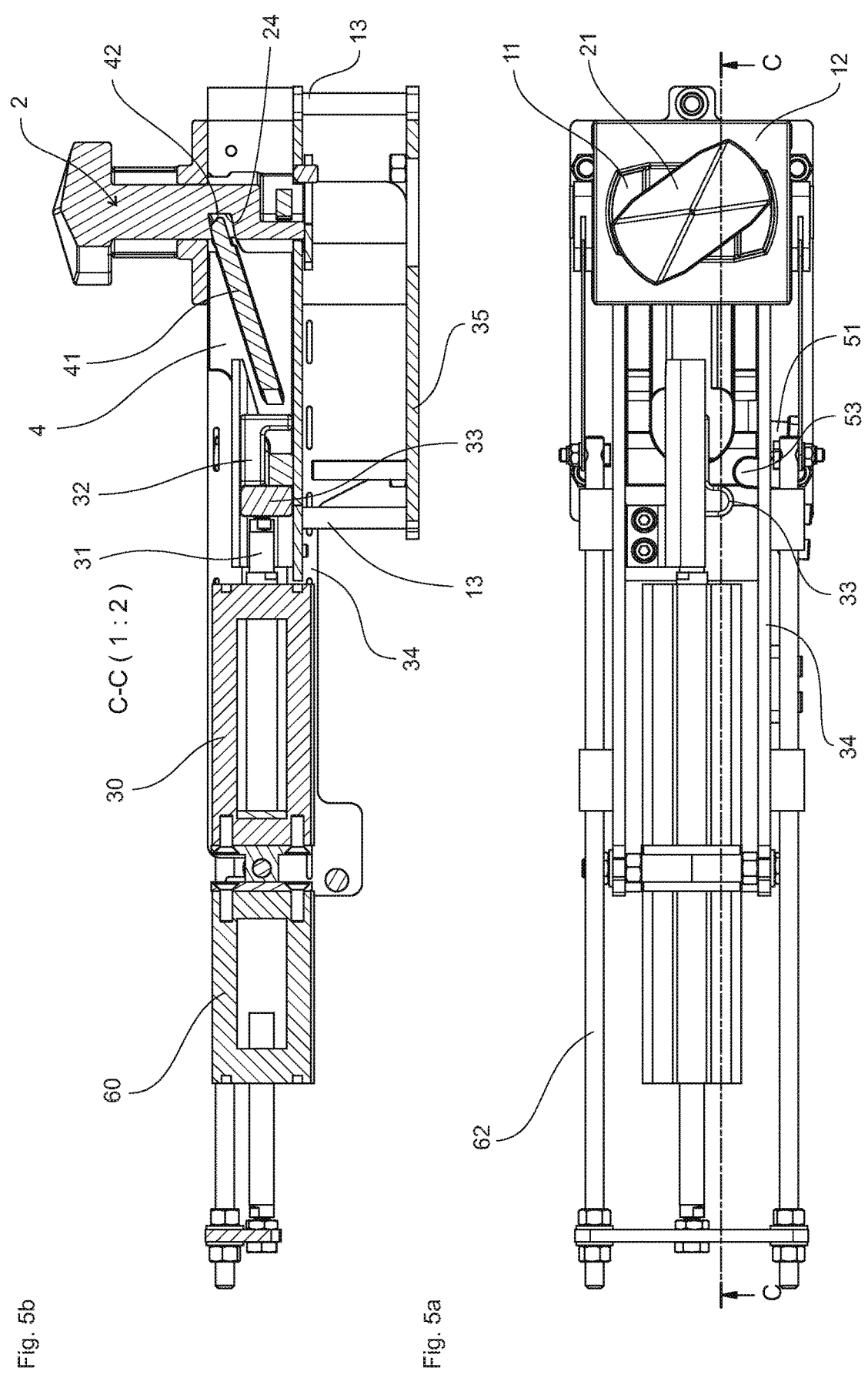

As can be seen in the top view in FIG. 5a a trigger projection 33 is arranged on the drive claw 32, which is arranged at the free end of the first piston rod 31, which can interact with a displacement component 53 of the locking device 5 in such a way that, then, if the container lock is to be opened from the locked state to the unlocked state by actuating the first double-acting pneumatic cylinder 30, first a short idle stroke is carried out, with which the trigger projection 33 moves the displacement component 53 and thus the lock 51 against the load pressure of the leaf spring 52 out of the path of the wedge slide 4. As the movement continues, the wedge slide 4 then slides again in front of the lock 51, i.e. back to the left in the plane of the drawing in FIG. 2, whereby the shaft 20 is raised by means of the inclined support 41 sliding along the recess 23 and ultimately is turned bac to the position shown in FIG. 2.

These components and actuating elements described so far relate to the locking of a container by means of the locking bolt 2 in the locking housing 1, as long as the container locking device is in the locking position, i.e. in the raised position. The components for lowering and raising and the corresponding functional sequence will now be described.

A second drive 6 is additionally arranged in or on the elongated drive box 34, in extension of the first drive 3, which is designed as a second double-acting pneumatic cylinder 60 and has a second piston rod 61, which is oriented in the opposite direction (actuation direction X) to the first piston rod 31. At the free end of the second piston rod 61, a cross member 63 is arranged, on which two push rods 62 are arranged on opposite sides and parallel to the longitudinal axis of the elongated drive box 34. In the exemplary embodiment shown here, the push rods 62 are held on suitable bearings on the outside of the elongated drive box 34. The piston rods 31, 61 and the push rods 62 can be moved in the actuation direction X (FIG. 2). At the free end of the push rods 62, a lever mechanism 7 is arranged, which is arranged on both sides of the elongated drive box 34 and each has a crank rod 72 which acts on a lever 73, the lever 73 being pivotally mounted about a crank pivot 71 mounted on the locking housing 1. As already shown at the beginning in the explanation of FIGS. 1 and 2, the locking housing 1 can be raised and lowered, i.e. is mounted so that it can move in the Z direction in suitable thrust bearings 13, the thrust bearings 13 being designed for straight guidance when the locking housing 1 is moved and consequently prevent tilting.

The function for raising and lowering the locking housing 1 by the second drive 6 is described below.

From the lowered position (rest position) of the locking housing 1 according to FIGS. 1 and 3 *a, b*, the locking housing 1 with the locking bolt 2 is raised by actuating the second drive 6 in the following manner. In the lowered position (rest position), the second piston rod 61 of the second double-acting pneumatic cylinder 60 is retracted, as shown in FIG. 1, for example. The locking housing 1 thus rests with its underside on a lower base plate 35 of the elongated drive box 34.

If the second double-acting pneumatic cylinder 60 is now actuated, the second piston rod 61 extends and transmits the movement in the actuation direction X via the cross member 63 to the two push rods 62, so that over the lever mechanism 7, namely the crank rod 72 and the lever 73, this lever 73 is rotated clockwise 90° about the crank pivot 71 in the spatial view seen in FIG. 1 and FIG. 2. At this time the outside 74 of the lever 73 slides over the base plate 35 of the elongated drive box 34 and lifts the locking housing 1 with the locking bolt 2, guided by the thrust bearings 13, exactly in the vertical direction Z. In this raised position (locking position) shown in FIG. 2 the lever 73 is shown in a position rotated by 90°, with the lever 73 resting with a supporting edge 75 on the base plate 35 of the elongated drive box 34. Any loads on the locking bolt 2 or the locking housing 1 when setting down a container are thus transferred to the construction and thus to the loading surface of the vehicle.

When the locking housing 1 is moved in the vertical direction (Z), the wedge slide 4 guided in the locking housing 1 is also lifted and shortly before reaching the locking position, the wedge slide 4 comes into engagement with the drive claw 32 on the first piston rod 31, so that subsequently when the first drive 3 is actuated an actuation of the locking bolt 2 by moving the wedge slide 4 is possible. It is important that the engagement of the wedge slide 4 in the drive claw 32 has sufficient play, as can be seen in a cross-sectional comparison in FIGS. 4 *b* and 5 *b*.

If the container lock is now to be lowered again, the second double-acting pneumatic cylinder 60 is actuated accordingly and the second piston rod 61 is retracted, whereby the lever mechanism 7 is returned to its basic position (rest position) via the cross member 63 and push rods 62 by turning the lever 73 back about the crank pivot 71 via crank rod 72. This lowers the locking housing 1 with the therein located locking bolt 2 and the wedge slide 4 in its rest position resting directly on the base plate 35.

REFERENCE SYMBOL LIST 1 locking housing
11 guide component
12 load bearing surface
13 thrust bearings
2 locking bolts
20 shaft 21 locking head
23 recess
24 contact edge
3 first drive
30 first double-acting pneumatic cylinder
31 first piston rod
32 drive claw
33 trigger projection
34 elongated drive box
35 base plate
4 wedge slides
41 inclined support
42 pushing protrusion
5 locking device
51 lock
52 leaf spring
53 displacement component
6 second drive
60 second double-acting pneumatic cylinder
61 second piston rod
62 push rod
63 cross member
7 lever mechanism
71 crank pivot
72 crank rod
73 levers
74 outside of lever
75 supporting edge
X actuation direction
Z vertical axis

The invention claimed is:

1. A container locking device on a vehicle, for locking a container with a corner fitting to be transported on a loading surface of the vehicle, comprising a locking housing (1), a locking bolt (2), a first drive (3) and a second drive (6), wherein the locking bolt (2) has a shaft (20) and a locking head (21), which in the unlocked state can be inserted via an opening in the corner fitting of the container and in the locked state secures the container via projections engaging behind the opening in the corner fitting, the locking housing (1) with the locking bolt (2) can be lowered and raised again by means of a lever mechanism (7), from a locking position in which the locking head (21) protrudes sufficiently over the loading surface for locking with the corner fitting of the container, to a rest position in which the locking head (21) does not protrude above the loading surface, the first drive (3) is operatively connected exclusively to the locking bolt (2), the second drive (6) is operatively connected to the lever mechanism, wherein the first drive (3) has a first double-acting pneumatic cylinder (30) with a first piston rod (31) movable in an actuation direction (X) and the second drive (6) has a second double-acting pneumatic cylinder (60) with a second piston rod (61) which can also be moved in the actuation direction (X), and wherein the second pneumatic cylinder (60) is provided in the actuation direction (X) behind the first pneumatic cylinder (30) and together with it is arranged on and/or in one elongated drive box (34) and is connected to the lever mechanism (7) via laterally guided push rods (62), and wherein the lever mechanism (7) includes, on the locking housing which can be raised and lowered, a horizontal and perpendicular to the actuation direction (X) oriented crank pivot (71), a crank rod (72) which is articulated to the push rod (62), and a lever (73) which can be rotated about the crank pivot (71) by means of the crank rod (72).

2. The container locking device according to claim 1, wherein a wedge slide (4) is arranged in the locking housing (1) and is mounted so that it can be moved laterally back and forth and in the locking position of the locking housing (1) a drive claw (32) at the free end of the first piston rod (31) is in engagement with the wedge slide (4).

3. The container locking device according to claim 2, wherein a safety locking device is arranged on the elongated drive box (34), which has a spring-loaded lock (51) which is designed to intrude in the lateral movement path of the wedge slide (4), with an inclined support formed between the lock (51) and the wedge slide (4), which causes the lock (51) to be released when the locking housing (1) is lifted from the rest position into the locking position.

* * * * *